(12) United States Patent
Hashimura et al.

(10) Patent No.: US 6,781,767 B2
(45) Date of Patent: Aug. 24, 2004

(54) ZOOM OPTICAL SYSTEM WITH A PRESCRIBED CONJUGATE DISTANCE

(75) Inventors: Junji Hashimura, Sakai (JP); Masaya Kinoshita, Sakai (JP); Kenji Hamada, Sakai (JP)

(73) Assignee: Minolta Co., Ltd., Osaka (JP)

( * ) Notice: Subject to any disclaimer, the term of this patent is extended or adjusted under 35 U.S.C. 154(b) by 324 days.

(21) Appl. No.: 09/957,168

(22) Filed: Sep. 19, 2001

(65) Prior Publication Data

US 2002/0060854 A1 May 23, 2002

(30) Foreign Application Priority Data

Sep. 25, 2000 (JP) ........................................ 2000-290545

(51) Int. Cl.$^7$ ............................................. G02B 15/22
(52) U.S. Cl. ...................................... 359/684; 359/676
(58) Field of Search ................................. 359/684, 683, 359/694, 676–682, 685–692

(56) References Cited

U.S. PATENT DOCUMENTS

| | | | | |
|---|---|---|---|---|
| 4,938,572 A | | 7/1990 | Iwasaki | 350/423 |
| 5,062,695 A | | 11/1991 | Iwasaki | 359/689 |
| 5,602,680 A | | 2/1997 | Sakamoto | 359/679 |
| 6,333,822 B1 | * | 12/2001 | Ohtake | 359/684 |

* cited by examiner

*Primary Examiner*—Hung Xuan Dang
(74) *Attorney, Agent, or Firm*—Sidley Austin Brown & Wood LLP

(57) ABSTRACT

A zoom optical system has a focus adjusting unit that performs focusing for an object by moving along an optical axis thereof and a magnification adjusting unit that corrects a change in optical magnification caused by the focusing by moving along an optical axis thereof.

11 Claims, 4 Drawing Sheets

ZOOM OPTICAL SYSTEM WITH A PRESCRIBED CONJUGATE DISTANCE

RELATED APPLICATION

This application is based on application No. 2000-290545 filed in Japan, the content of which is hereby incorporated by reference.

FIELD OF THE INVENTION

The present invention relates to a zoom optical system, and more specifically, to a finite-distance zoom optical system suitable particularly as an imaging optical system for a film scanner or the like.

DESCRIPTION OF THE PRIOR ART

Conventionally, apparatuses such as film scanners that scan images on various sizes of photographic films and capture the images as image information have had a predetermined structure in order that different film formats can be handled. That is, in these apparatuses, films are scanned while the imaging magnification is varied according to the film format by use of a finite-distance zoom optical system with a fixed conjugate distance.

However, in this structure, when a film position error is corrected in focusing or the like, the captured area of the film image formed on the image sensing device changes due to the change in the magnification of the optical system.

SUMMARY OF THE INVENTION

An object of the present invention is to provide an improved zoom optical system.

Another object of the present invention is to provide a finite-distance zoom optical system having a system that is capable of performing imaging at a required magnification by eliminating the magnification change due to the conjugate distance change caused by a film position error or the like.

The above-mentioned object is attained by a zoom optical system comprising: a focus adjusting unit that performs focusing for an object; and a magnification adjusting unit that corrects a change in optical magnification caused by the focusing.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Embodiments of the present invention will be described with reference to the drawings. In the embodiments described below, it is assumed that a first lens unit (first unit) of a finite-distance zoom optical system is a magnification adjusting unit and a second lens unit (second unit) is a focus adjusting unit.

Figure 1:
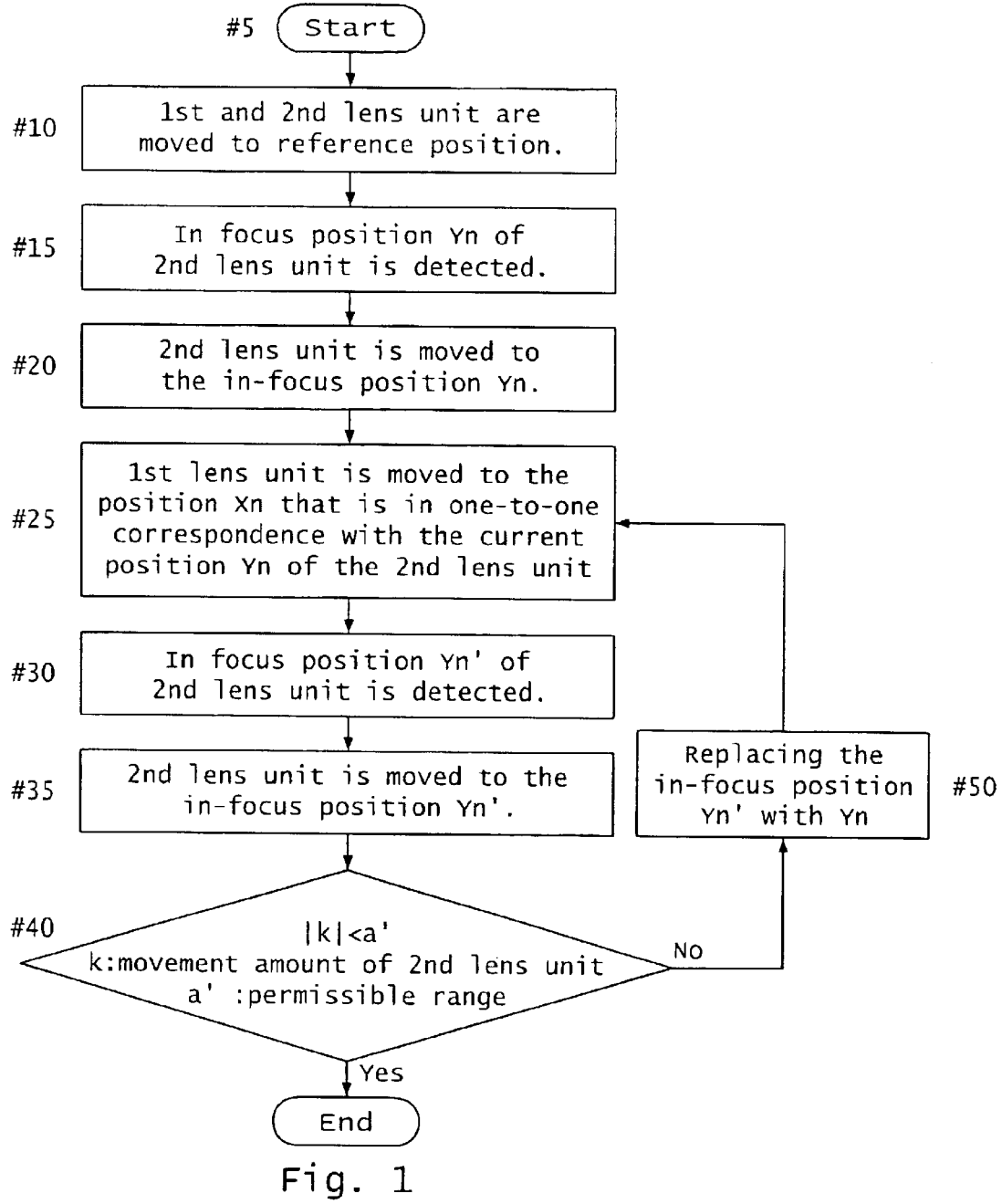
FIG. 1 is a flowchart showing a method of moving lens units of a finite-distance zoom optical system of a first embodiment of the present invention.

FIG. 1 is a flowchart showing a method of moving lens units of a finite-distance zoom optical system of a first embodiment of the present invention. In this embodiment, a lens unit moving method is shown in which the optical magnification and the in-focus position are successively driven to optimum values and errors are converged in a permissible range. Table 1 schematically shows position data of first and second lens units with respect to an optical magnification. The optical magnification is set to various values according to the difference in film format, the required enlargement magnification and the like. In Table 1, the position data of the first and the second lens units when the lens units are moved from the reference positions in the positive and the negative directions by a unit amount are represented by X and Y. The positions X and Y are previously calculated. The magnification is fixed for positions $X_n$ and $Y_n$ that are in one-to-one correspondence with each other.

TABLE 1

| 1st unit | 2nd unit | Position |
|---|---|---|
| $X_{-2}$ | $Y_{-2}$ | −2 |
| $X_{-1}$ | $Y_{-1}$ | −1 |
| $X_0$ | $Y_0$ | Reference position (0) |
| $X_1$ | $Y_1$ | +1 |
| $X_2$ | $Y_2$ | +2 |

In FIG. 1, first, at step #5, the lens units are started moving, and at step #10, the first and the second lens units are respectively moved to the reference positions $X_0$ and $Y_0$ shown in Table 1 which reference positions are in one-to-one correspondence with each other with respect to the specified magnification. Then, at step #15, the in-focus position (AF position) of the second lens unit is detected. That is, when the second lens unit is moved to each of the positions, the pattern image based on which whether in-focus state is obtained or not is determined is captured by the optical system, and the position, for example, where the highest MTF characteristic value is obtained is detected as the in-focus position.

Specifically, the second lens unit is moved from the reference position by a unit amount, for example, in the positive direction on the position data, and the MTF characteristic value $MTF_1$ at the position +1 shown in Table 1 is compared with the MTF characteristic value $MTF_0$ at the reference position. Then, the second lens unit is moved every unit amount in the positive direction when $MTF_1 > MTF_0$ and in the negative direction when $MTF_1 < MTF_0$, and the position where the highest MTF characteristic value is obtained is detected. This position is set as an in-focus position $Y_n$ (n is an integer).

Then, at step #20, the second lens unit is moved to the in-focus position $Y_n$. Since the in-focus position is detected while the second lens unit is being moved at step #15 in actuality, when it is determined that in-focus state is obtained, the second lens unit is in the in-focus position. Then, at step #25, the optical magnification slightly changed due to the movement of the second lens unit is corrected. Specifically, as is apparent from Table 1, the first lens unit is moved to the position $X_n$ that is in one-to-one correspondence with the current position $Y_n$ of the second lens unit.

Then, at step #30, the in-focus position slightly changed due to the movement of the first lens unit is corrected. Specifically, the in-focus detection is again performed by moving only the second lens unit similarly to step #15. This position is set as an in-focus position $Y_n'$. Then, at step #35, the second lens unit is moved to the in-focus position $Y_n'$. Since the in-focus position is detected while the second lens unit is being moved at step #30 in actuality, when it is determined that in-focus state is obtained, the second lens unit is in the in-focus position.

Then, when it is determined at step #40 that the absolute value of the movement amount k ($=n'-n$) of the second lens unit at step #35 is within a permissible range $\alpha$ drawn in consideration of the optical performance and the movement resolution, the process proceeds to step #45 to finish the correction of the optical magnification and the in-focus position. When the absolute value is outside the permissible range $\alpha$, the process proceeds to step #50 to replace the in-focus position $Y_n'$ with $Y_n$. Then, the process returns to step #25 to repeat a similar processing.

The permissible range $\alpha$ means a focus movement amount corresponding to a maximum permissible depth of focus $F \cdot \delta$. Here, F is the f-number, and $\delta$ is the maximum permissible diameter of the circle of permission.

Figure 2:
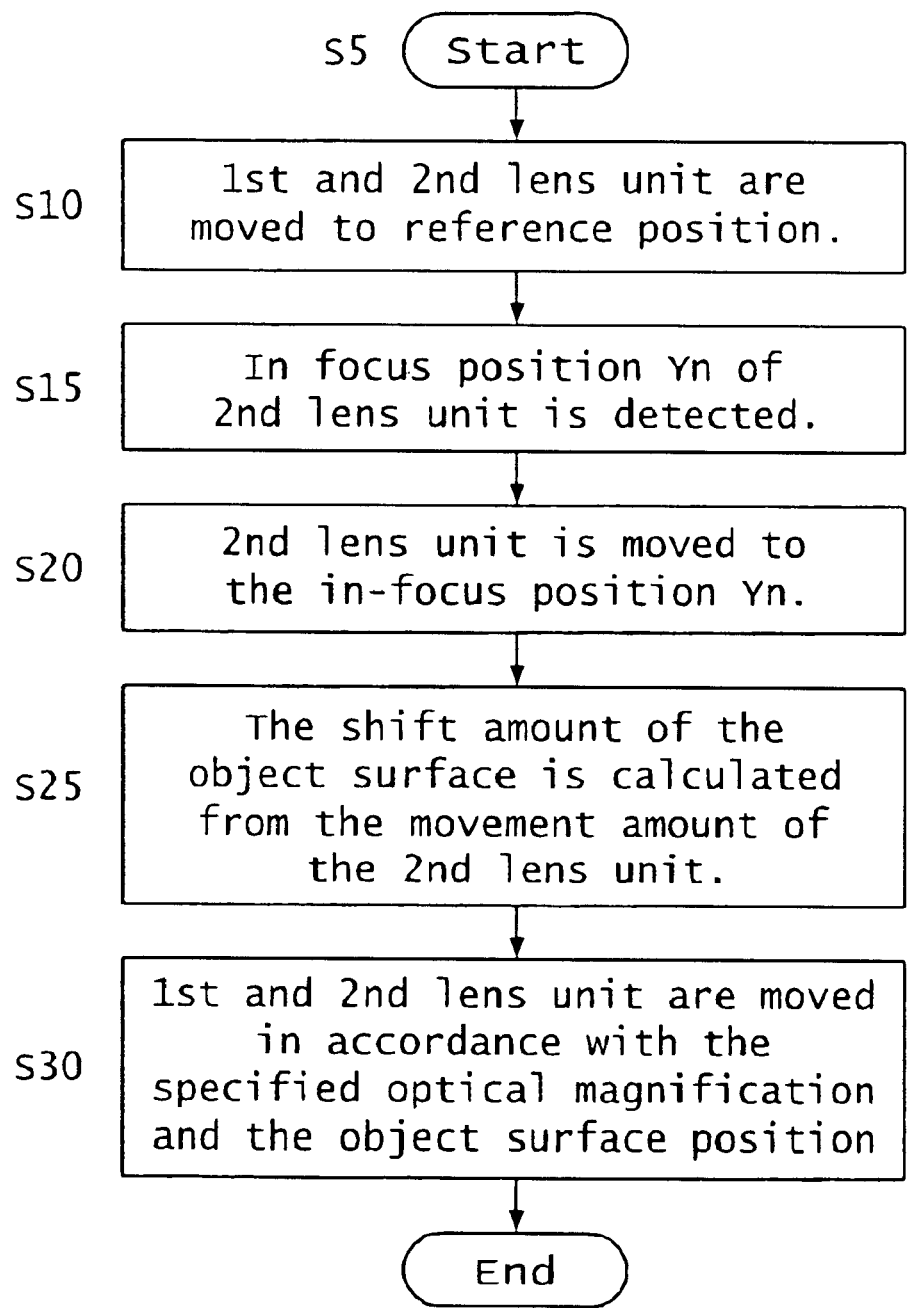
FIG. 2 is a flowchart showing a method of moving lens units of a finite-distance zoom optical system of a second embodiment of the present invention.

FIG. 2 is a flowchart showing a method of moving lens units of a finite-distance zoom optical system according to a second embodiment of the present invention. In this embodiment, a lens unit moving method is shown in which the actual conjugate distance is calculated from the movement amounts of the lens units used for focusing and the lens units are moved to the optimum positions for the conjugate distance and the specified magnification.

In FIG. 2, first, at step S5, the lens units are started moving, and at step S10, the first and the second lens units are respectively moved to the reference positions $X_0$ and $Y_0$ shown in Table 1 which reference positions are in one-to-one correspondence with each other with respect to the specified magnification. Then, at step S15, the in-focus position (AF position) of the second lens unit is detected. That is, when the second lens unit is moved to each of the positions, the pattern image based on which whether in-focus state is obtained or not is determined is captured by the optical system, and the position, for example, where the highest MTF characteristic value is obtained is detected as the in-focus position.

Specifically, the second lens unit is moved from the reference position by a unit amount, for example, in the positive direction on the position data, and the MTF characteristic value $MTF_1$ at the position +1 shown in Table 1 is compared with the MTF characteristic value $MTF_0$ at the reference position. Then, the second lens unit is moved every unit amount in the positive direction when $MTF_1 > MTF_0$ and in the negative direction when $MTF_1 < MTF_0$, and the position where the highest MTF characteristic value is obtained is detected. This position is set as the in-focus position $Y_n$ (n is an integer).

Then, at step S20, the second lens unit is moved to an in-focus position $Y_n$. Since the in-focus position is detected while the second lens unit is being moved at step S15 in actuality, when it is determined that in-focus state is obtained, the second lens unit is in the in-focus position. Then, at step S25, the shift amount of the object surface is calculated from the movement amount of the second lens unit (second unit) by the following expression:

(the shift amount of the object surface)=(the movement amount of the second unit)×(the focus change rate of the second unit)

Here, the focus change rate is the change amount of the object surface position per unit movement amount.

Then, at step S30, the lens units are moved in accordance with the specified optical magnification and the object surface position by the following expressions:

(the movement amount of the first unit)=(the shift amount of the object surface)×(the movement coefficient of the first unit)

(the movement amount of the second unit)=(the shift amount of the object surface)×(the movement coefficient of the second unit)−(the movement amount of the second unit at step S20)

Here, the movement coefficient is the movement amount of each lens unit per unit object surface shift amount. This value is determined with respect to the specified optical magnification. Lastly, the process proceeds to step S35 to finish the correction of the optical magnification and the in-focus position.

Figure 3:
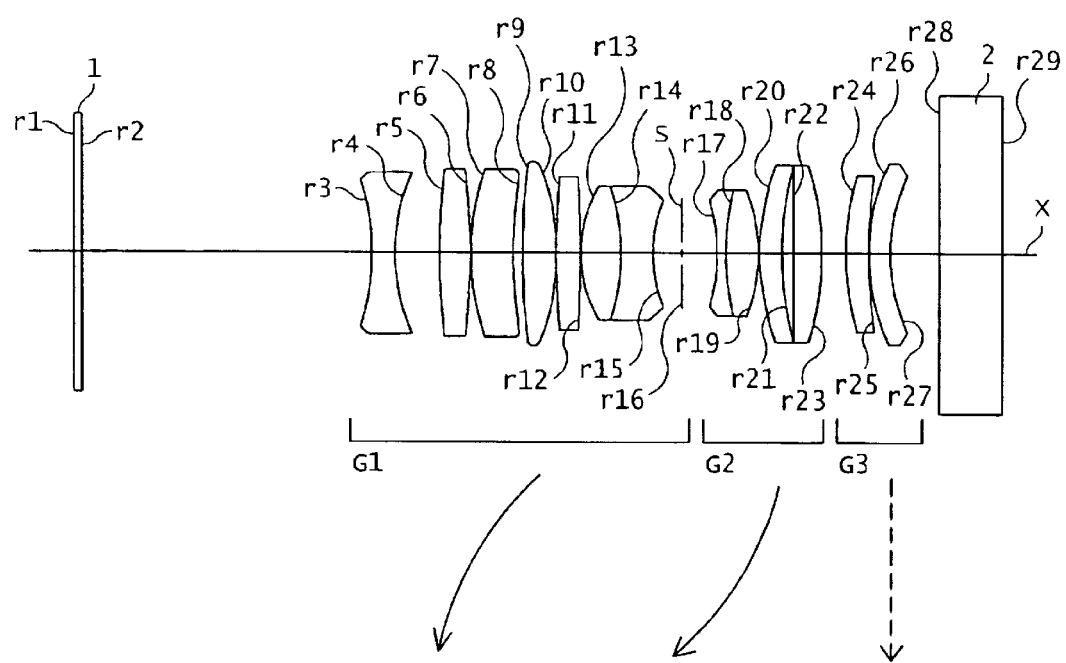
FIG. 3 shows the structure of a finite-distance zoom optical system of a first example.
Figure 4:
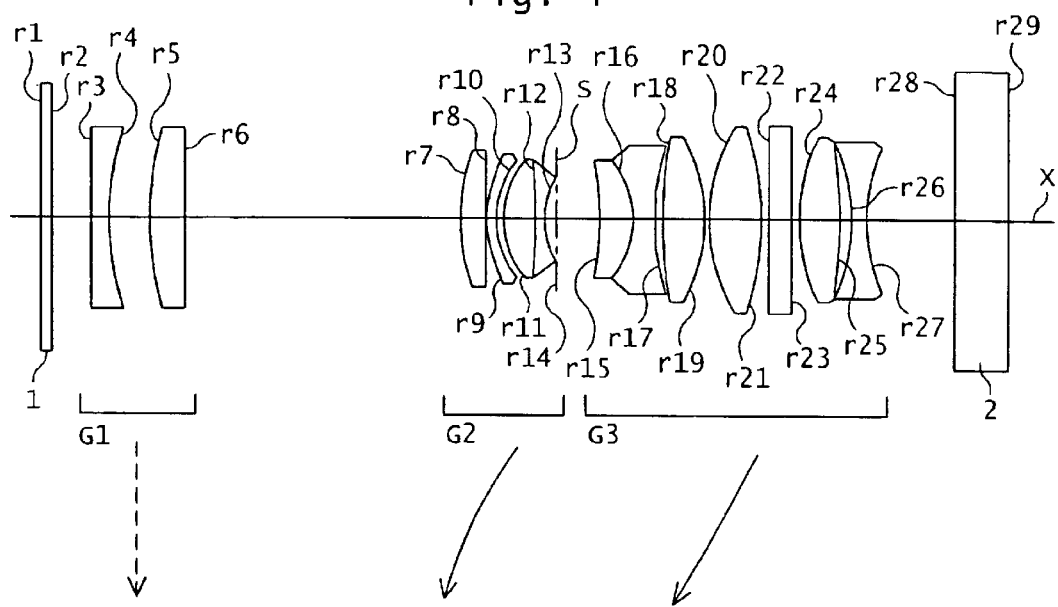
FIG. 4 shows the structure of a finite-distance zoom optical system of a second example.

FIGS. 3 and 4 show the structures of finite-distance zoom optical systems of first and second examples, respectively. In these figures, the left side is the object side, and the right side is the image side. The arrows in the figures schematically show the manners of movements of the lens units from the shortest focal length condition to the longest focal length condition in zooming. The broken line arrow indicates that the lens unit is stationary. The figures show the shortest focal length conditions in zooming.

As shown in FIG. 3, the first example is a three-unit zoom lens system comprising from the object side: a first lens unit G1 which is a positive magnification adjusting unit; a second lens unit G2 which is a positive focus adjusting unit; and a third lens unit G3 which is a negative stationary unit. Zooming is performed by adjusting the distances between the lens units.

As shown in FIG. 4, the second example is a three-unit zoom lens system comprising from the object side: a first lens unit G1 which is a negative stationary unit; a second lens unit G2 which is a positive magnification or focus adjusting unit; and a third lens unit G3 which is a positive magnification or focus adjusting unit. Zooming is performed by adjusting the distances between the lens units. In this example, the magnification adjusting unit and the focus adjusting unit change places with each other according to the specified optical magnification. The zoom lens system may be structured so that the magnification adjusting unit and the focus adjusting unit change places with each other like this.

The lens unit moving methods of the first and the second embodiments are applicable to both of the above-described examples. A parallel plate at the object side end designated by 1 is a cover glass. A parallel plate at the image side end designated by 2 is a prism. Reference designation S represents a diaphragm. The optical axis is designated by X.

It is desirable for the finite-distance zoom optical system of the present invention to satisfy the following condition (1):

$$0.9 < F+/FW < 2.5 \qquad (1)$$

where F+ is the focal length of the movable lens unit, and FW is the overall focal length of the optical system in the shortest focal length condition.

The condition (1) defines the focal lengths of the movable lens units. By satisfying this condition, size reduction of the apparatus and aberration correction are facilitated. When the upper limit of the condition (1) is exceeded, aberration correction in zooming is difficult. When the lower limit is exceeded, the lens movement amount in zooming is large, so that size reduction of the apparatus is difficult.

It is desirable for the finite-distance zoom optical system of the present invention to satisfy the following condition (2):

$$F-/FW<-5 \qquad (2)$$

where F− is the focal length of the stationary lens unit, and FW is the overall focal length of the optical system in the shortest focal length condition.

The condition (2) defines the focal length of the stationary unit. By satisfying the condition, aberration correction in zooming is facilitated. When the upper limit of this condition is exceeded, variations in aberrations such as astigmatism and distortion in zooming are large, so that aberration correction is difficult.

The structures of the zoom optical systems according to the present invention will be more concretely shown with construction data.

In each example, ri (i=1,2,3, . . . ) represents the i-th surface counted from the object side and the radius of curvature of the surface, di (i=1,2,3, . . . ) represents the i-th axial distance counted from the object side, and Ni (i=1,2,3, . . .) and vi (i=1,2,3, . . . ) represent the refractive index and the Abbe number, to the d-line, of the i-th lens element counted from the object side, respectively. INF represents a plane surface. The values of the overall optical magnification β of the optical system and the values of the distances between the lens units in the examples are, from the left, values in the shortest focal length condition (W), in the middle focal length condition (M) and in the longest focal length condition (T).

TABLE 2

(Example 1)

β = −0.6 mm ~−1.0 mm ~−1.5 mm (Overall optical magnification)
[Radius of curvature]   [Refractive index (Nd)]
       [Axial distance]   [Abbe number (v d)]

| | | | |
|---|---|---|---|
| r1 = INF | | | |
| | d1 = 1.500 | N1 = 1.51680 | v 1 = 64.20 |
| r2 = INF | | | |
| | d2 = 58.349 | ~25.639 | ~5.029 |
| r3 = −52.339 | | | |
| | d3 = 4.300 | N2 = 1.59551 | v 2 = 39.24 |
| r4 = 38.696 | | | |
| | d4 = 9.010 | | |
| r5 = 156.250 | | | |
| | d5 = 5.940 | N3 = 1.80518 | v 3 = 25.42 |
| r6 = −164.096 | | | |
| | d6 = 0.200 | | |
| r7 = 57.742 | | | |
| | d7 = 8.400 | N4 = 1.80518 | v 4 = 25.42 |
| r8 = 104.226 | | | |
| | d8 = 1.740 | | |
| r9 = 145.611 | | | |
| | d9 = 6.240 | N5 = 1.49310 | v 5 = 83.58 |
| r10 = −48.855 | | | |
| | d10 = 0.200 | | |
| r11 = 100.386 | | | |
| | d11 = 4.560 | N6 = 1.49310 | v 6 = 83.58 |
| r12 = −1064.305 | | | |
| | d12 = 0.200 | | |
| r13 = 28.989 | | | |
| | d13 = 7.590 | N7 = 1.49310 | v 7 = 83.58 |
| r14 = −47.019 | | | |
| | d14 = 6.560 | N8 = 1.62004 | v 8 = 36.26 |
| r15 = 22.000 | | | |
| | d15 = 6.000 | | |
| r16 = INF (Diaphragm) | | | |
| | d16 = 6.700 | ~18.701 | ~6.707 |
| r17 = −34.660 | | | |
| | d17 = 2.000 | N9 = 1.69895 | v 9 = 30.13 |

TABLE 2-continued (Example 1)

| | | | |
|---|---|---|---|
| r18 = 50.107 | | | |
| | d18 = 6.470 | N10 = 1.49310 | v 10 = 83.58 |
| r19 = −37.278 | | | |
| | d19 = 0.200 | | |
| r20 = 54.387 | | | |
| | d20 = 4.920 | N11 = 1.84666 | v 11 = 23.78 |
| r21 = 69.677 | | | |
| | d21 = 2.210 | | |
| r22 = −985.416 | | | |
| | d22 = 4.960 | N12 = 1.84666 | v 12 = 23.78 |
| r23 = −64.088 | | | |
| | d23 = 5.000 | ~25.710 | ~58.313 |
| r24 = 61.878 | | | |
| | d24 = 4.380 | N13 = 1.48749 | v 13 = 70.23 |
| r25 = 103.719 | | | |
| | d25 = 0.200 | | |
| r26 = 45.961 | | | |
| | d26 = 4.000 | N14 = 1.51633 | v 14 = 64.14 |
| r27 = 32.933 | | | |
| | d27 = 10.000 | | |
| r28 = INF | | | |
| | d28 = 12.700 | N15 = 1.51680 | v 15 = 64.20 |
| r29 = INF | | | |

TABLE 3

(Example 2)

β = −0.6 mm ~−1.1 mm ~−1.5 mm (Overall optical magnification)
[Radius of curvature]   [Refractive index (Nd)]
       [Axial distance]   [Abbe number (v d)]

| | | | |
|---|---|---|---|
| r1 = INF | | | |
| | d1 = 2.000 | N1 = 1.51680 | v 1 = 64.20 |
| r2 = INF | | | |
| | d2 = 8.000 | | |
| r3 = −2618.281 | | | |
| | d3 = 4.000 | N2 = 1.75000 | v 2 = 25.14 |
| r4 = 59.123 | | | |
| | d4 = 8.281 | | |
| r5 = 85.194 | | | |
| | d5 = 7.000 | N3 = 1.80518 | v 3 = 25.43 |
| r6 = −2689.401 | | | |
| | d6 = 57.202 | ~18.765 | ~7.794 |
| r7 = 42.782 | | | |
| | d7 = 5.104 | N4 = 1.72825 | v 4 = 28.46 |
| r8 = 565.700 | | | |
| | d8 = 0.712 | | |
| r9 = 29.061 | | | |
| | d9 = 2.000 | N5 = 1.69895 | v 5 = 30.13 |
| r10 = 19.023 | | | |
| | d10 = 1.098 | | |
| r11 = 19.056 | | | |
| | d11 = 6.907 | N6 = 1.49310 | v 6 = 83.58 |
| r12 = −81.617 | | | |
| | d12 = 2.000 | N7 = 1.58144 | v 7 = 40.75 |
| r13 = 23.361 | | | |
| | d13 = 2.000 | | |
| r14 = INF (Diaphragm) | | | |
| | d14 = 8.642 | ~16.558 | ~4.920 |
| r15 = −43.613 | | | |
| | d15 = 6.590 | N8 = 1.49310 | v 8 = 83.58 |
| r16 = −18.902 | | | |
| | d16 = 5.000 | N9 = 1.63930 | v 9 = 44.87 |
| r17 = 58.691 | | | |
| | d17 = 1.175 | | |
| r18 = 74.652 | | | |
| | d18 = 8.177 | N10 = 1.49310 | v 10 = 83.58 |
| r19 = −39.793 | | | |
| | d19 = 1.075 | | |
| r20 = 39.752 | | | |
| | d20 = 11.044 | N11 = 1.49310 | v 11 = 83.58 |
| r21 = −60.357 | | | |
| | d21 = 0.700 | | |

TABLE 3-continued (Example 2)

| | | | |
|---|---|---|---|
| r22 = INF | | | |
| | d22 = 5.000 | N12 = 1.51680 | v 12 = 64.20 |
| r23 = INF | | | |
| | d23 = 2.000 | | |
| r24 = 49.803 | | | |
| | d24 = 7.953 | N13 = 1.84666 | v 13 = 23.82 |
| r25 = −98.871 | | | |
| | d25 = 2.430 | | |
| r26 = −45.196 | | | |
| | d26 = 3.000 | N14 = 1.72151 | v 14 = 29.23 |
| r27 = 31.077 | | | |
| | d27 = 18.998 | ~49.518 | ~72.128 |
| r28 = INF | | | |
| | d28 = 11.260 | N15 = 1.51680 | v 15 = 64.20 |
| r29 = INF | | | |

Values, corresponding to the conditions, of the examples are shown below.

TABLE 4

| | 1st example | 2nd example |
|---|---|---|
| F+/FW | 1.784 (2nd unit) | 1.387 (1st unit) |
| | 1.333 (3rd unit) | 2.037 (2nd unit) |
| F−/FW | −38.698 (1st unit) | −8.0143 (3rd unit) |

As described above, according to the present invention, a finite-distance zoom optical system can be provided having a system that is capable of performing imaging at a required magnification by eliminating the magnification change due to the conjugate distance change caused by a film position error or the like.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom optical system with a prescribed conjugate distance comprising:
   a focus adjusting unit that performs focusing for an object at the prescribed distance from the object by moving along an optical axis thereof; and
   a magnification adjusting unit that corrects a change in optical magnification caused by the focusing of said focus adjusting unit by moving along the optical axis thereof.

2. A zoom optical system as claimed in claim 1, wherein the focus adjusting unit and the magnification adjusting unit sequentially move so that the optical magnification and the in-focus position are successively driven to optimum values and errors are converged in a permissible range.

3. A zoom optical system as claimed in claim 1, wherein a actual conjugate distance is calculated from the movement amounts of the focusing adjusting units during initial focusing and the focus adjusting unit and the magnification adjusting unit move to the optimum positions for a specified magnification based on the calculated actual conjugate distance.

4. A zoom optical system as claimed in claim 1, wherein the magnification adjusting unit and the focus adjusting unit are changable their function with each other.

5. A zoom optical system as claimed in claim 1, wherein the system includes at least one stationary unit and at least one movable unit movable along the optical axis, wherein one of said stationary unit having a negative optical power.

6. A zoom optical system as claimed in claim 5, wherein the system fulfilled a following condition:

$$0.9 < F+/FW < 2.5$$

where F+ is the focal length of the movable unit, and FW is the overall focal length of the optical system in the shortest focal length condition.

7. A zoom optical system as claimed in claim 5, wherein the system fulfilled a following condition:

$$F-/FW < -5$$

where F− is a focal length of one of a stationary unit during zooming, and FW is the overall focal length of the optical system in the shortest focal length condition.

8. An imaging optical apparatus comprising:
   a zoom optical system for forming an image of an object on a predetermined object plane onto a predetermined image plane; and
   an image sensing device closely provided at the predetermined image plane and for receiving the image of the object,
   the zoom optical system comprising:
      a focus adjusting unit that performs focusing for an object by moving along an optical axis thereof; and
      a magnification adjusting unit that corrects a change in optical magnification caused by the focusing by moving along an optical axis thereof.

9. An imaging optical apparatus as claimed in claim 8, wherein the focus adjusting unit and the magnification adjusting unit sequentially move so that the optical magnification and the in-focus position are successively driven to optimum values and errors are converged in a permissible range.

10. An imaging optical apparatus as claimed in claim 8, wherein a actual conjugate distance is calculated from the movement amounts of the focusing adjusting units during initial focusing and the focus adjusting unit and the magnification adjusting unit move to the optimum positions for a specified magnification based on the calculated actual conjugate distance.

11. An imaging optical apparatus as claimed in claim 8, the object is photographic film.

* * * * *